United States Patent [19]

Isoda et al.

[11] Patent Number: 5,546,504
[45] Date of Patent: Aug. 13, 1996

[54] INFORMATION PROCESSING DEVICE CAPABLE OPTICALLY WRITING SYNAPSE STRENGTH MATRIX

[75] Inventors: Satoru Isoda; Yoshio Hanazato, both of Hyogo-ken, Japan

[73] Assignee: Mitsubishi Denki Kabushiki Kaisha, Tokyo, Japan

[21] Appl. No.: 337,153

[22] Filed: Nov. 9, 1994

[30] Foreign Application Priority Data

Jul. 10, 1990 [JP] Japan ................................. 2-184526

[51] Int. Cl.$^6$ .............................. G06G 7/16; H01L 31/08
[52] U.S. Cl. ........................................... 395/25; 364/822
[58] Field of Search .............................. 395/25; 364/822, 364/807

[56] References Cited

U.S. PATENT DOCUMENTS

| | | | |
|---|---|---|---|
| 4,760,437 | 7/1988 | Denker et al. | 395/25 |
| 4,766,471 | 8/1988 | Ovshinsky et al. | 357/19 |
| 4,988,891 | 1/1991 | Mashiko | 307/201 |
| 4,999,688 | 3/1991 | Hara et al. | 395/25 |
| 5,003,360 | 3/1991 | Okada et al. | 357/22 |
| 5,014,096 | 5/1991 | Matsuda et al. | 357/19 |
| 5,028,969 | 7/1991 | Kasahara et al. | 357/19 |
| 5,093,875 | 3/1992 | Ogura et al. | 385/17 |
| 5,129,040 | 7/1992 | Hanazato et al. | 395/25 |
| 5,159,603 | 10/1992 | Kim | 372/45 |
| 5,229,623 | 7/1993 | Tanoue et al. | 257/25 |
| 5,416,891 | 5/1995 | Isoda et al. | 395/25 |

OTHER PUBLICATIONS

Nikkei High Tech Report vol. IV, No. 14, 22 May 1989, London GB, p. 11—Mitsubishi "Biodevice uses protein conductivity" *p. 11, left column, line 1—middle column, line 3*.

C. Koch, "Computing Motion in the Presence of Discontinuities: Algorithm and Analog Networks", NATO ASI Series, vol. F41, Neural Computers, Berlin (1988), pp. 101–110.
Hopfield, "Computing with Neural Circuits: A Model", Science, vol. 233, Aug. 1986.
Electronics Engineers' Handbook, Donald G. Fink, First Edition 1975.
J. Ohta et al., "GaAs/AlGaAs optical synaptic interconnection device for neural networks", Aug. 15, 1989, vol. 14, No. 16 Optic Letters, Optical Society of America.
B. W. Lee and B. J. Sheu, "An Investigation on Local Minima of Hopfield Network for Optimization of Circuits", IEEE Int'l Conference on Neural Networks, Jul. 24–27, 1988, pp. 1–46 to 1–51.
C. D. Kornfeld et al., "An Optically Programmed Neural Network", IEEE Int'l Conference On Neural Networks, Jul. 24–27, 1988, pp. II–358 to II–364.
H. Yonezu et al., "An Optoelectronic Synaptic Connection Circuit with Variable Analog and Nonvolatile Weights", 29 Jul. 1990, No. 7, Part 2, Tokyo, JP, 362 Japanese Journal of Applied Physics.
C. A. Mead, "A Silicon Model of Early Visual Processing", Neural Networks, vol. 1, 1988, pp. 91–97.

*Primary Examiner*—George B. Davis
*Attorney, Agent, or Firm*—Wolf, Greenfield & Sacks, P.C.

[57] ABSTRACT

An information processing device having neural network functions for performing information processing includes a semiconductor integrated circuit section including a plurality of neuronic circuit regions having a neuronic function which is one of the neural network functions, and first and second molecular films provided on the integrated circuit section. The first molecular film has a photoelectric function and the second molecular film has a light-emitting function. Coupling between the plurality of neurons is realized through a combination of the light-emitting and light-receiving functions of the first and second molecular films.

22 Claims, 4 Drawing Sheets

INFORMATION PROCESSING DEVICE CAPABLE OPTICALLY WRITING SYNAPSE STRENGTH MATRIX

BACKGROUND OF THE INVENTION

1. Field of the Invention

The present invention relates to an information processing device in which a synapse strength matrix (Tij) representing inter-neuron wiring in neural information processing can be written by rays of light from light-emitting elements formed in the device.

2. Prior Art

FIG. 1 is a diagram showing an integrated circuit in an information processing device simulating a neural circuit network which is shown, for example, on page 625 of "Science", 233, by J. J. Hopfield et al (1986). In the drawing, the reference numeral 1 indicates a unit of neurons each of which includes a resistor 2, a capacitor 3 and an amplifier 4. The reference numeral 5 indicates a Tij indicative of a level of interaction between neurons. The reference numerals 6 and 7 respectively, indicate an input line connected to the neuron 1 and an output line extending therefrom.

The operation of this integrated circuit will now be described. Information carried by an external signal is supplied, as an input to the processing device, to the neuron 1 in the form, for example, of electric current, through the input line 6. The-input line 6 crosses output line 7 of another neuron at the Tij portions 5 before the input line 6 reaches the neuron 1, the current input to the neuron 1 is affected by the output line 7. The Tij portions 5 generally consist of a fixed resistor formed within the information processing device when what device is manufactured. In the neuron 1, the resistor 2 and the capacitor 3 convert the input current value, to a voltage value is amplified by the amplifier 4, whereby an output of firing (+V) or suppression (−V) is emitted. When the respective outputs of the neurons of the entire network have attained stability, optimum target information is obtained among these output values.

A conventional information processing device being constructed such as described above, neurons, wiring lines and Tij portions have to be previously formed in the device. As a result, the number of neurons that can be integrated in the device is limited. In addition, the value of Tij portions cannot be changed.

SUMMARY OF THE INVENTION.

The present invention has been made with a view to solving the above problems. It is accordingly an object of the invention to provide an information processing device which is capable of enhancing the degree of integration of neurons and to allow TiJ values to be rewritten with ease.

In accordance with an aspect of the invention, there is provided an information processing device comprising a semiconductor integrated circuit section simulating a neuronic function of a neural network; a photoelectric section including a heterogeneous molecular film having a photoelectric function and placed between electrodes; and a light emitting section, both photoelectric and light-emitting sections being provided on the integrated section; wherein TiJ signals from the light emitting section can be written in the photoelectric section.

In accordance with another aspect of the invention, there is provided an information processing device in which the photoelectric section and the light emitting section are formed in a multilayer structure on the semiconductor integrated circuit section in which neuronic circuit regions are arranged in matrix.

According to the present invention, Tij portions coupling the neuronic circuit regions to each other comprise a photoelectric heterogeneous molecular film provided on the semiconductor circuit section in which neuronic circuit regions are provided, and electrodes formed on both sides of the molecular film. Coupling strength between the neurons is input by means of light from a matrix-like light-emitting device which comprises electrodes and a light-emitting heterogeneous molecular film placed therebetween. This structure allows the coupling between the neurons to be changed. Further, in accordance with the invention, the photoelectric section and the light emitting section both comprising electrodes and a heterogeneous molecular film placed therebetween may be built three-dimensionally on the semiconductor integrated circuit section, whereby the number of neurons that can be integrated per unit area can be increased substantially.

Further, in the present invention, the photoelectric section may be built in a multilayer structure on the semiconductor integrated circuit in which the neuronic circuit regions are arranged in matrix, whereby the number of wiring lines for forming the Tij couplings can be reduced, thereby making it possible to increase the number of neurons that can be integrated.

DETAILED DESCRIPTION OF THE PREFERRED EMBODIMENTS

An embodiment of the present invention will now be described with reference to the accompanying drawings.

Figure 1:
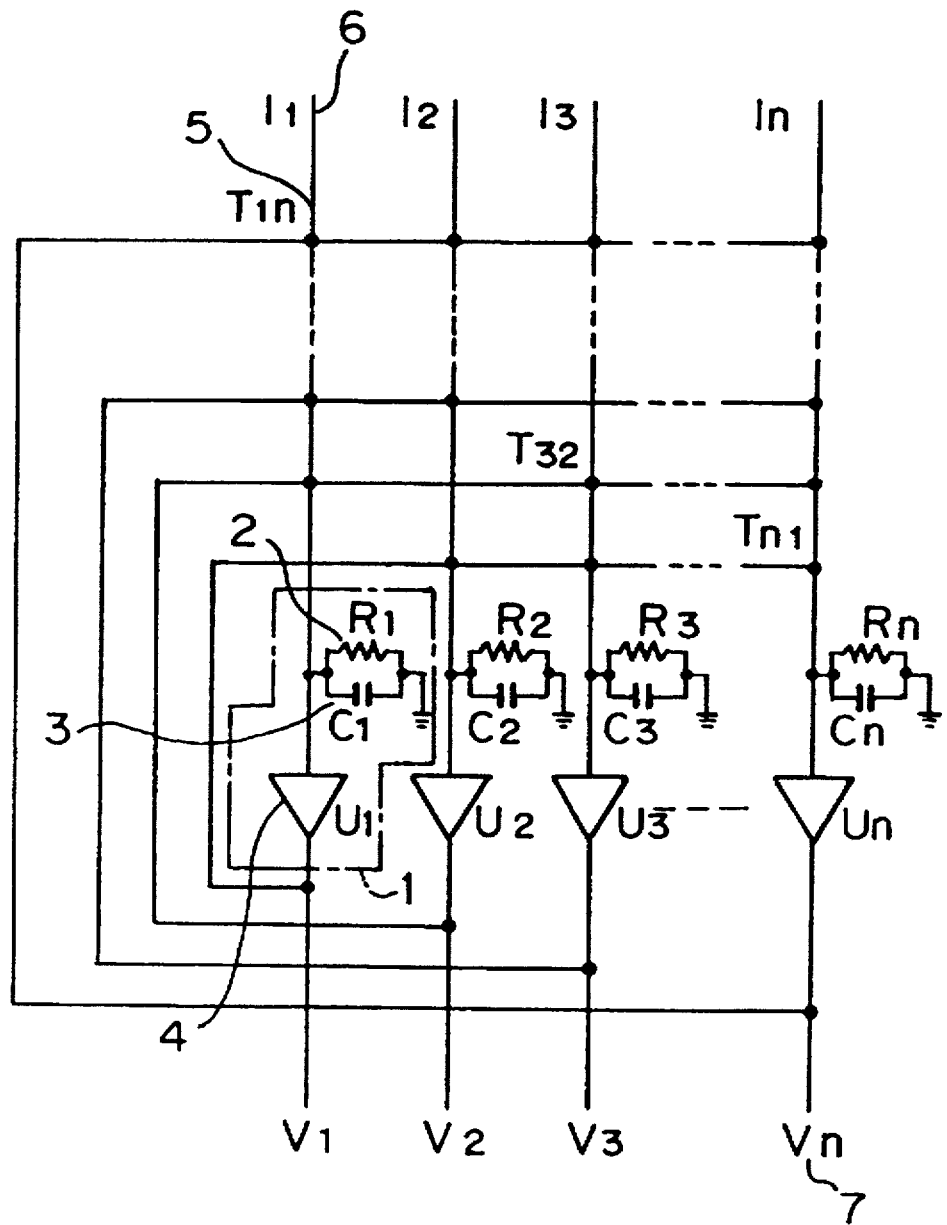
FIG. 1 is a circuit diagram showing a conventional information processing device.
Figure 2A:
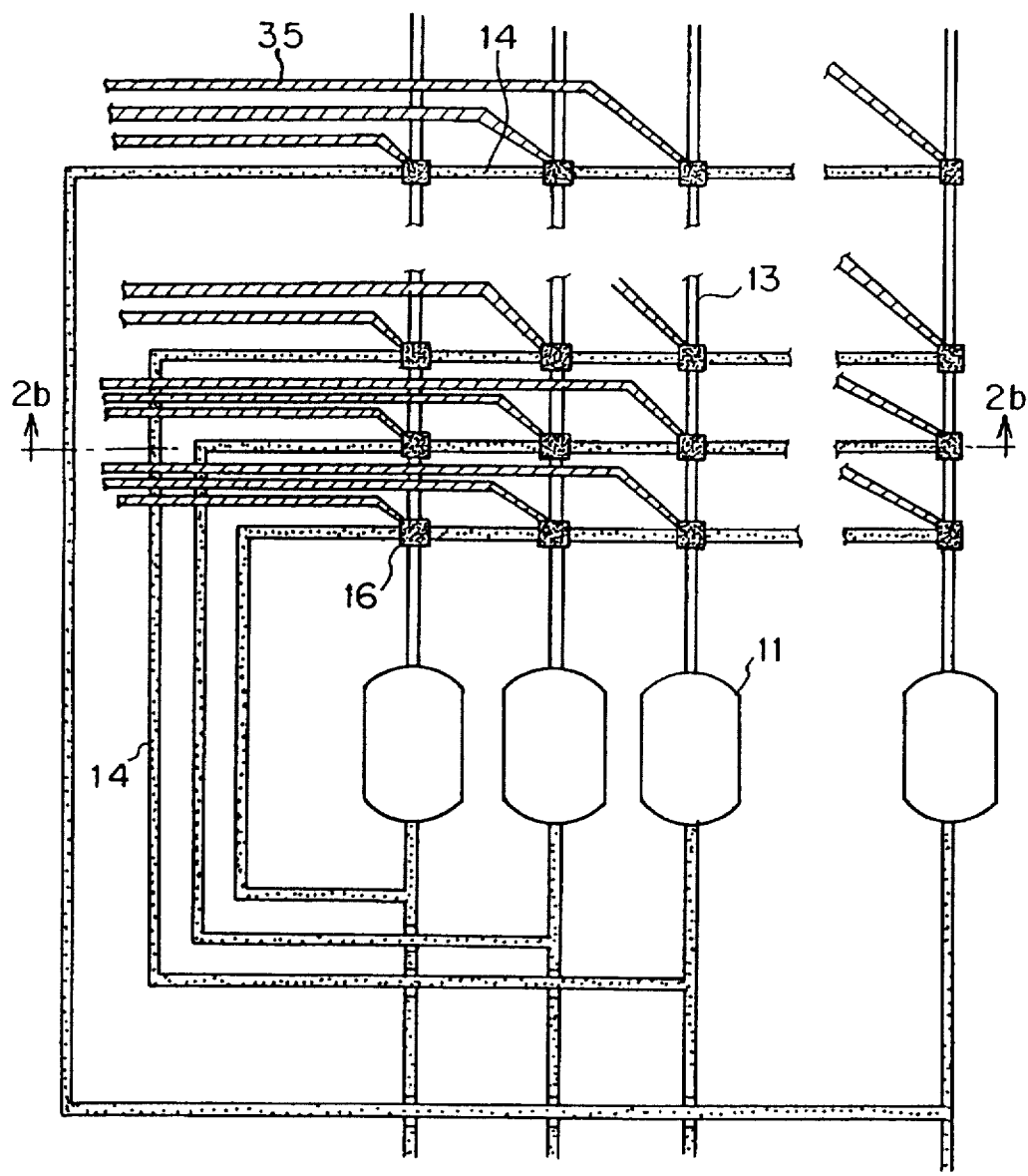
FIGS. 2(a) and 2(b) are diagrams showing a plan view of a Tij matrix wiring pattern in an information processing device in accordance with embodiment of the present invention and a partial sectional view of the same.
Figure 2B:
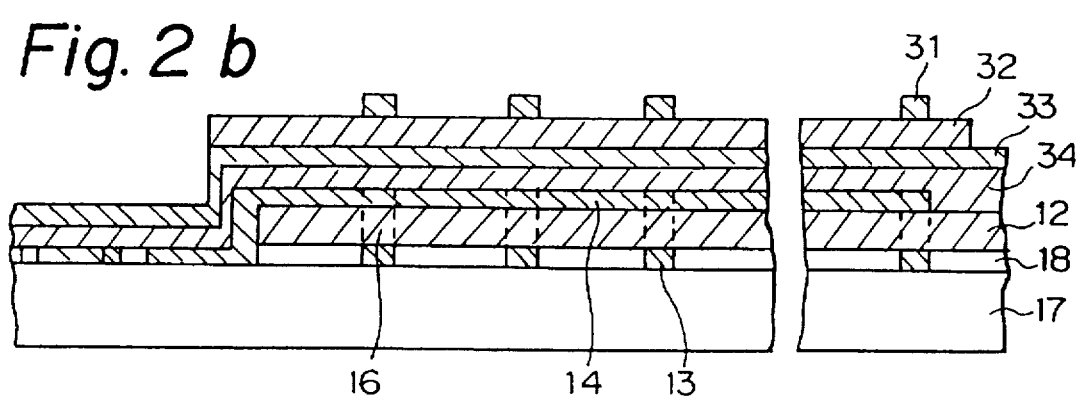

FIG. 2(a) is a wiring diagram showing the construction of an information processing device in accordance with an embodiment of this invention and FIG. 2(b) is a sectional view taken along the line 2b—2b of FIG. 2(a). The device shown includes neurons 11, a molecular film 12 having a photoelectric function, input wiring lines 13, output wiring lines 14, synaptic junction sections 16, a silicon substrate 17, an insulating film 18, electrodes 31 for light-emitting elements, a molecular film 32 having a light-emitting function, a transparent electrode 33 for the light-emitting elements, a transparent insulating layer 34, and lead wires 35 for the electrodes 31.

A method of producing the device of this embodiment will be described next.

The neurons 11 which are formed as analog or digital circuits so as to simulate a neuronic operation of a living body are arranged in columns in the silicon substrate 17 using integrated circuit technologies. Then, the input wiring lines 13 are formed on one surface of the integrated circuit by vacuum evaporation of aluminum. The other surface of the integrated circuit (where no input wiring lines 13 are formed) are covered by an insulating film, such as an $SiO_2$ film 18, thus leveling the surface of the integrated circuit. On this wafer on which the integrated circuit and the wiring lines have been formed, several layers of porphyrin derivative are deposited by the Langmuir-Blodgett method and, then, several layers of flayin derivative are deposited thereon, thereby forming the heterogeneous molecular film 12.

This molecular film 12 has a property of changing a current flowing between the electrodes in accordance with the intensity of light impinging thereto.

Then, the output wiring lines 14 are formed on the molecular film 12 by vacuum evaporation of aluminum, ITO, $SnO_2$, etc. such that they overlap the Tij portions 16. In this process, the Tij portions 16 should be transparent so as to allow light to be transmitted to the molecular films.

Subsequently, the transparent insulating layer 34 is formed on the molecular film 12 and the output wiring lines 14 by using $SiO_2$, a high molecular substance, etc., and, on this layer 34, the transparent electrode 33 is formed of such material as ITO, SnO2 and aluminum.

Then, an amine-type material, such as TPD [N, N'-diphenyl-N, N'-(3-methyl phenyl)-1, 1'-biphenyl-4, 4'-diamine], is deposited as a hole transporting film on the transparent electrode 83 by the cluster ion beam (ICB) method and, then, an emitter material such as anthracene is deposited on this hole-transporting film by the ICB method, and, on this emitter material layer, a perylene tetracarboxylic acid derivative is deposited as an electron-transporting film by the ICB method, thus forming the molecular film 32 having a light emitting function.

Finally, formed on the electron transporting film are. Mg electrodes which serve as the electrodes 31. The wiring leads 35 are formed by vacuum evaporation of a metal such as aluminum and are connected to the Mg electrodes.

Next, the operation of the above device will be described. In a neuro-network, a signal input to a neuron is coupled to a signal output from another neuron before the input signal is supplied to that neuron. Such a coupling affects an input condition for the neuron to which the input signal is supplied. However, it does not follow that the outputs of all the neurons affect one neuron. By determining the manner in which the output of a neuron affects an input to another neuron in accordance with the information to be processed, the input information can be processed at high speed and with high efficiency. This embodiment utilizes the photoconductivity of the molecular film 12 and the light emitting function of the molecular film 32. That is, light signals from the molecular film 32 are received by the molecular film 12, and the Tij portions 16 transmit signal output from the neurons 11 based on a change in conductivity of the molecular film 12. In other words, since the output wiring lines 14 on the molecular film 12 and the input wiring lines 13 therebelow are interconnected, by applying a light pattern on the molecular film 32 to the Tij portions 16 as a matrix signal, a high efficiency information processing as mentioned above can be realized. Further, in the Tij portions 16, currents flowing between the output wiring lines 14 and the input wiring lines 13 can be controlled in accordance with the intensity of light. That is, the resistance in the Tij portions 16 can be changed according to the intensity of light, so that, in addition to an ON/OFF digital pattern formed by the matrix section 32, changes in voltage applied between the electrodes 31 and 33 can be utilized as optical signals to be supplied to the Tij portions 16, thereby making it possible to realize an information processing which is still more efficient than in the case where binary Tij values are used. Further, since a Tij pattern is prepared by optical writing as described above, the rewriting of Tij pattern can be achieved, thus making it possible to realize an information processing of a higher level than in the case where a Tij pattern is fixed.

By changing a Tij pattern and Tij resistance in accordance with output signals, it is also possible to impart a learning function to information processing.

Figure 3A:
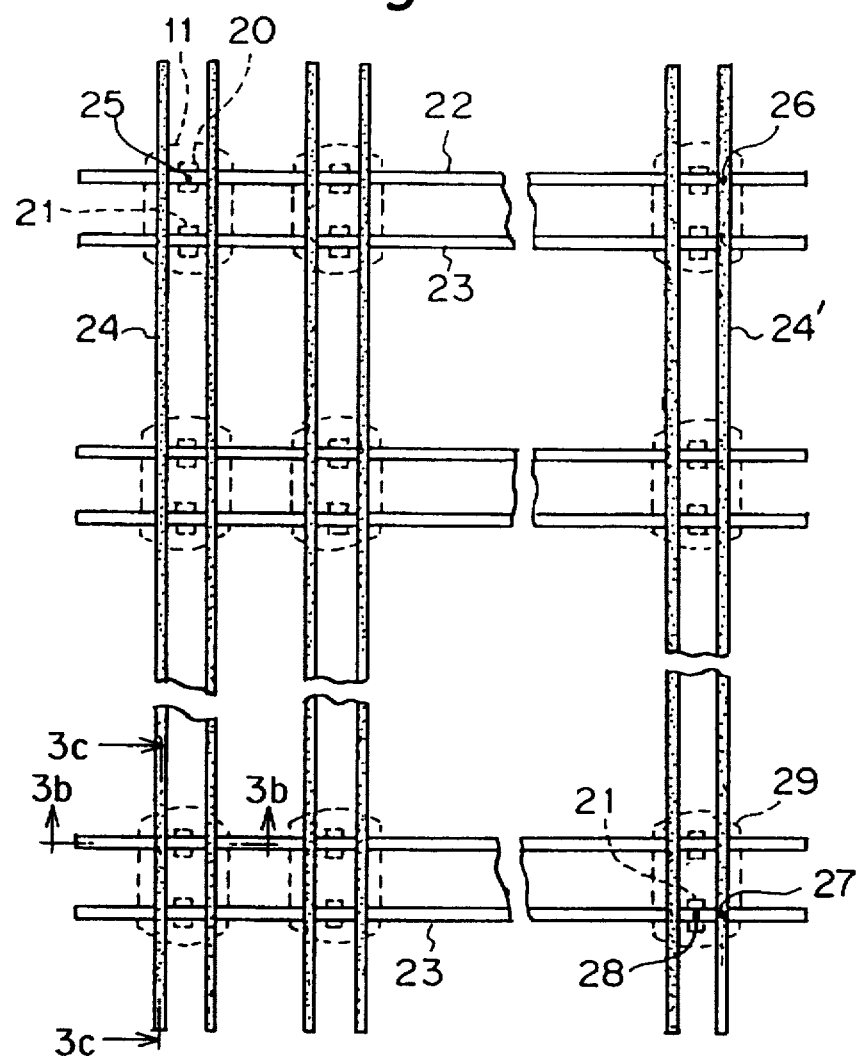
FIGS. 3(a), 3(b) and 3(c) are diagrams showing a plan view of a neuron connecting pattern an information processing device in accordance with another embodiment of this invention and partial sectional views of the same.
Figure 3B:
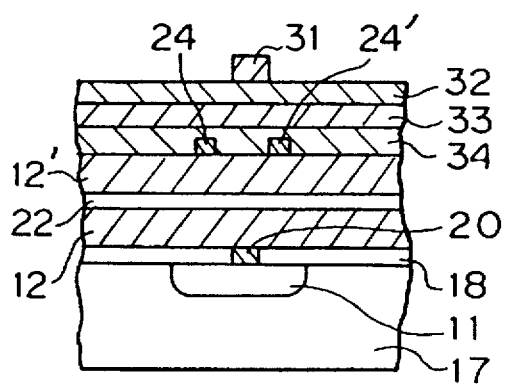
Figure 3C:
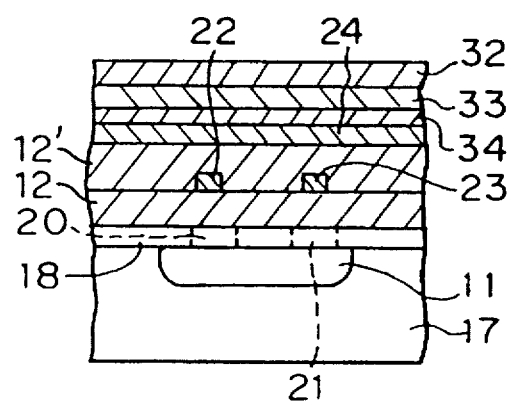

FIG. 3(a) is a wiring diagrams showing an information processing device in accordance with another embodiment of the present invention, and FIGS. 3(b) and 3(c) are sectional views taken along the lines 3b–3b and 3c–3c, respectively, of FIG. 3(a). In the drawings, the components which are identical with or equivalent to those of FIGS. 2(a) and 2(b) are referred to by the same reference numerals and a description of such components is omitted here. The device shown includes output electrodes 20, input electrodes 21, and wiring lines 22 and 23 on the first layer of molecular film 12. The wiring lines 22 are positioned above the output electrodes 20, and the wiring lines 23 are positioned above the input electrodes 21. The reference numerals 24 and 24' indicate wiring lines on the second layer of molecular film 12'; the reference numerals 25 through 28 indicate positions to be irradiated with light; and 29 indicates a neuron spaced away from the neuron 11.

Next, a method of producing the device of this embodiment will be described.

Neurons 11 and 29 which consist of analog or digital circuits formed so as to simulate a neuronic operation in a living body, are arranged in matrix form on one surface of a silicon substrate 17 by the integrated circuit technique. Then, by vacuum evaporation of a metal such as aluminum, the output and input electrodes 20 and 21 of the neurons are formed on the integrated circuit. The remaining portions of the surface of the integrated circuit where no electrodes are formed are covered with an insulating film such as the $SiO_2$ film 18, thereby leveling the circuit surface. On this wafer thus formed, the first layer of molecular film 12 having heterojunction is formed by the Langmuir-Blodgett method in the same manner as in the embodiment shown in FIGS. 2(a) and 2(b). Semitransparent aluminum wiring lines 22 and 23 are formed on this first layer of molecular film 12 such as to respectively extend just above the output electrodes 20 and the input electrodes 21 of the neurons 11 aligned in lateral rows. Afterwards, the second layer of molecular film 12' is formed in the same manner as the first layer of molecular film 12. Then, semitransparent aluminum electrodes 24 and 24' are formed, two for each neuron, on the second layer of molecular film 12' such as to extend above the neurons 11 aligned in longitudinal rows but not to overlap the output and input electrodes 20 and 21 of these neurons. The elements of the light-emitting sections 31 through 35 are formed in the same manner as in the case of the device shown in FIGS. 2(a) and 2(b).

Next, the operation of the above device will be described. For example, the output of the neuron 11 in the upper left corner and the input of the neuron 29 in the right bottom corner of FIG. 3(a) are interconnected in the following manner. A plurality of rays of light irradiate those sections of the device shown in FIG. 3(a) where neuron electrodes and wiring lines cross each other. When, for example, an intersection point 25 of the output electrode 20 of the upper left neuron 11 and one of the wiring lines 22 formed on the first layer of molecular film 12 is irradiated, this output electrode 20 and this wiring line 22 are electrically interconnected, thus transferring an electrical signal on the output electrode 20 to the wiring line 22. Then, when an intersection point 26 of the wiring line 22 and one of the wiring lines 24' formed on the second layer of molecular film 12' is irradiated with light, the above wiring line 22 and this wiring line 24 are electrically interconnected, thus transferring the electrical signal on the output electrode 20 of the neuron 11 to the wiring line 24'. When an intersection point 27 of the wiring line 24 and the wiring line 23 which is on the first film layer of molecular film 12 and extends above the input electrode 21 of the neuron 29 is irradiated with light, the wiring line 24' and this wiring line 23 are electrically interconnected, thereby transferring the electrical signal from the output electrode 20 of the neuron 11 to this wiring line 23. Finally, when an intersection point 28 of the wiring line 23 and the input electrode 21 of the neuron 29 is irradiated with light, the wiring line 23 and this input electrode 21 are electrically interconnected, thus allowing the electrical signal from the output electrode 20 of the neuron 11 to be transferred to the input electrode 21 of the neuron 29.

Thus, by simultaneously irradiating the four points of intersection 25, 26, 27 and 28 with light, the output of the neuron 11 can be coupled to the input of the neuron 29. Such a coupling relationship can be applied to other neurons, thus making it possible to express all the input/output couplings between the neurons.

Figure 4:
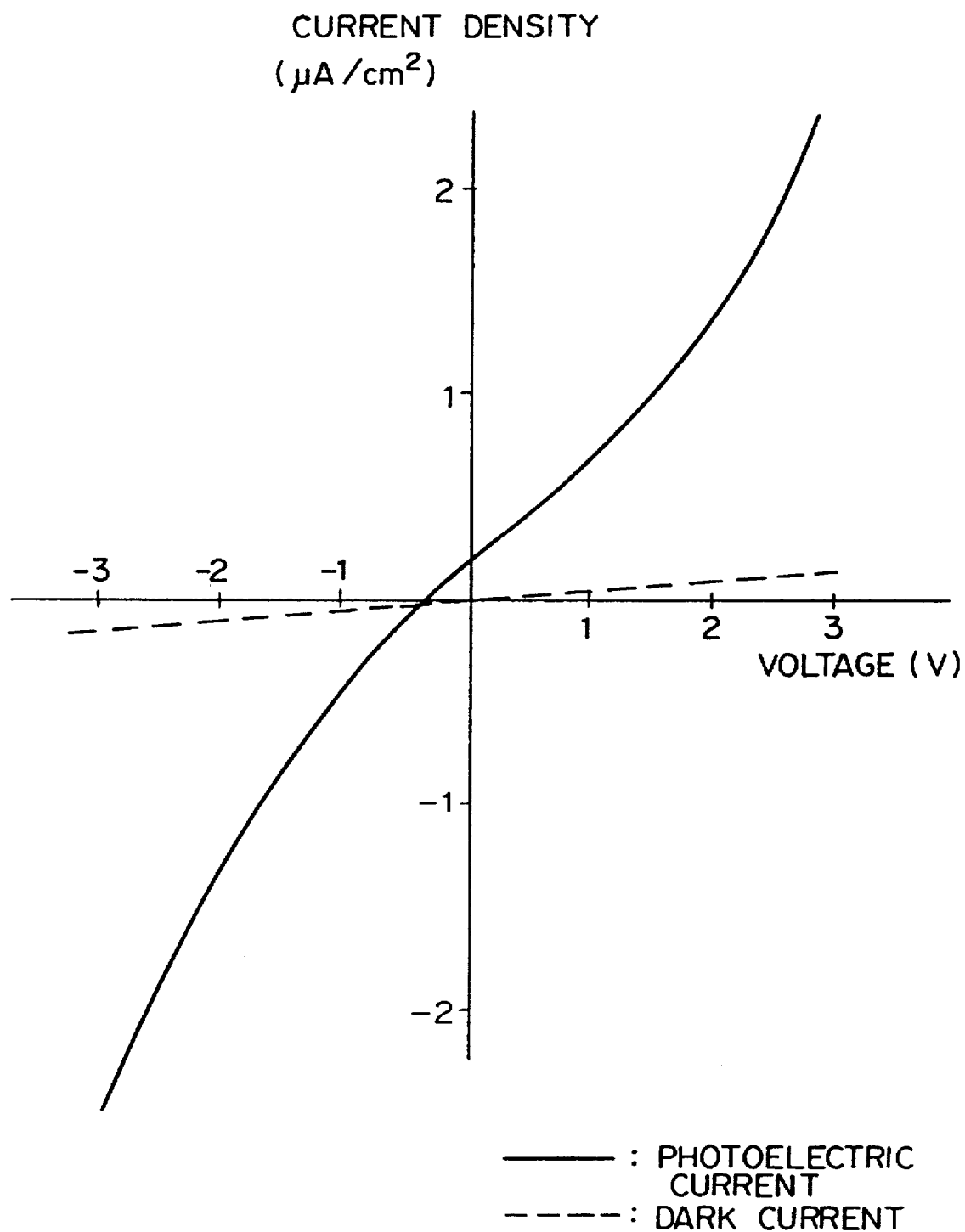
FIG. 4 is a chart showing a voltage-current characteristic of a molecular film obtained by heterogeneous accumulation.

FIG. 4 is a characteristic chart showing an example of the photoconductivity of the molecular film 12 and 12'.

Thus, an information processing device of this invention comprises a semiconductor integrated circuit section simulating a neuronic function of neural network, and a molecular film device provided on the integrated circuit section and having a photoelectric function, Tij portions of a plurality of neuronic circuit regions provided on the integrated circuit section being written by light. Due to this construction, the writing of the Tij matrix can be performed arbitrarily, and the number of wiring lines can be reduced. Accordingly, an information processing device can be obtained which performs information processing with high efficiency, and provides a high level of integration of neurons.

What is claimed is:

1. An information processing device having neural network functions for performing information processing comprising:

a semiconductor integrated circuit section having a surface and including a plurality of neuronic circuit regions having a neuronic function which is one of said neural network functions formed in said surface;

first molecular film means on said integrated circuit section surface, said first molecular film means comprising at least one first wiring line, a photoelectric material contacting a first portion of said first wiring line, and at least one second wiring line having a first portion contacting said photoelectric material, said first portion of said first wiring line, said first portion of said second wiring line, and said photoelectric material defining a junction;

a transparent insulating film on said first molecular film means; and second molecular film means having a light-emitting function on said transparent insulating film, said second molecular film means positioned so as to illuminate at least one junction so as to electrically interconnect said first and second wiring lines;

wherein coupling between said plurality of neuronic circuit regions occurs through a combination of the light-emitting and photoelectric functions of said first and said second molecular film means.

2. An information processing device as recited in claim 1, further comprising a substrate.

3. An information processing device as recited in claim 2;

wherein said substrate comprises said semiconductor integrated circuit section; and wherein said neuronic circuit regions are formed in said substrate.

4. An information processing device as recited in claim 3;

wherein said substrate is made of silicon.

5. An information processing device as recited in claim 1;

wherein said first molecular film means is provided on said semiconductor integrated circuit section; and wherein said second molecular film means is provided on said first molecular film means.

6. An information processing device as recited in claim 1;

wherein said first molecular film means further comprises:

a first layer comprising input wiring lines addressing said neuronic circuit regions, and insulating film; and a second layer provided on said first layer comprising a photoelectric molecular film; and a third layer provided on said second layer comprising output wiring lines addressing said neuronic circuit regions.

7. An information processing device as recited in claim 9;

wherein said photoelectric molecular film comprises several layers of porphyrin derivative, and several layers of flavin derivative provided on said porphyrin derivative.

8. An information processing device as recited in claim 1;

wherein said second molecular film means further comprises:

a first layer comprising a transparent electrode;

a second layer on said first layer comprising a light-emitting molecular film; and a third layer on said second layer comprising electrodes contacting said light-emitting molecular film.

9. An information processing device as recited in claim 8;

wherein said light-emitting molecular film comprises a hole-transporting film, an emitter material provided on said hole-transporting film, and an electron-transporting film provided on said emitter material.

10. An information processing device as recited in claim 9;

wherein said hole-transporting film comprises an amine; and wherein said emitter material comprises anthracene; and wherein said electron-transporting film comprises a perylene tetracarboxylic acid derivative.

11. An information processing device as recited in claim, 8;

further comprising wiring leads to address said electrodes.

12. An information processing device as recited in claim 1, wherein said neuronic circuit regions are formed as analog or digital circuits.

13. An information processing device as recited in claim 1, comprising:

a first layer comprising a silicon substrate;

a second layer on said first layer comprising input wiring lines and insulating film;

a third layer on said second layer comprising said photoelectric material;

a fourth layer on said third layer comprising output wiring lines and transparent insulating film;

a fifth layer on said fourth layer comprising transparent insulating film;

a sixth layer on said fifth layer comprising a transparent electrode;

a seventh layer on said sixth layer comprising said second molecular film means;

an eighth layer on said seventh layer comprising electrodes contacting said second molecular film means; and wiring leads contacting said electrodes.

14. An information processing device as recited in claim 13;

wherein each electrode of said seventh layer is positioned directly above the intersection of one of said input wiring lines of the second layer with one of said output wiring lines of the fourth layer, that is, a line perpendicular to the plane of the silicon substrate intersects said input wiring line, said output wiring line, and said electrode.

15. An information processing device having neural network functions for performing information processing comprising:

a semiconductor integrated circuit section having a surface and including a plurality of neuronic circuit regions formed in said surface, having a neuronic function which is one of said neural network functions; and a multi-layer structure on said semiconductor integrated circuit section surface, said multi-layer structure comprising a transparent insulating layer having a first surface and a second surface opposite said first surface, a first heterogeneous molecular film means having a photoelectric function on said insulating layer first surface, and a second heterogeneous molecular film means having a light-emitting function on said insulating layer second surface, wherein coupling between said plurality of neuronic circuit regions occurs through a combination of the light-emitting and photoelectric functions of said first and second heterogeneous molecular film means.

16. An information processing device as recited in claim 15, wherein said first heterogeneous molecular film means further comprises a porphyrin derivative in a thickness of several molecular layers and a flavin derivative in a thickness of several molecular layers provided on said porphyrin derivative layers.

17. An information processing device as recited in claim 15, wherein said second heterogeneous molecular film further comprises a hole-transporting film, a light-emitting film provided on said hole-transporting film, and an electron-transporting film provided on said light-emitting film.

18. An information processing device as recited in claim 15, further comprising image input elements.

19. An information processing device as recited in claim 18, wherein said image input elements comprise:

lower electrodes for image input provided on said semiconductor integrated circuit section, said first heterogeneous molecular film being provided on said lower electrodes for image input; and upper electrodes for image input provided on said first heterogeneous molecular film.

20. An information processing device comprising:

a semiconductor integrated circuit section having a surface and including a plurality of neuronic circuit regions formed in said surface;

a photoelectric molecular film on said surface;

a transparent insulating layer on said photoelectric molecular film;

a light-emitting molecular film on said transparent insulating layer;

a coupling input section comprising a first wiring line in contact with a first portion of said photoelectric molecular film and a second wiring line in contact with a second portion of said photoelectric molecular film;

a coupling output section comprising a first electrode in contact with a first portion of said light-emitting molecular film and a second electrode in contact with a second portion of said light-emitting molecular film;

an optical path between said coupling input and said coupling output semiconductor integrated circuit section such that when an electrical potential is applied between said first electrode and said second electrode, said coupling output produces light that illuminates said coupling input, electrically connecting said first wiring line and said second wiring line.

21. An information processing device as recited in claim 20 wherein said photoelectric molecular film comprises a porphyrin derivative and a thickness of several molecular layers and a flavin derivative in a thickness of several molecular layers provided on said porphyrin derivative layers.

22. An information processing device as recited in claim 20 wherein said light-emitting molecular film comprises a hole-transporting film, a light-emitting film provided on said hole-transporting film, and a electron-transporting film provided on said light-emitting film.

* * * * *

UNITED STATES PATENT AND TRADEMARK OFFICE
CERTIFICATE OF CORRECTION

PATENT NO. : 5,546,504
DATED : August 13, 1996
INVENTOR(S) : Satoru Isoda, et. al.

It is certified that error appears in the above-indentified patent and that said Letters Patent is hereby corrected as shown below:

Title page, item [63], under Related U.S. Application Data add--
Continuation of Serial No. 07/728,165, July 10, 1991, Patent No. 5,388,187,
dated February 7, 1995--.

Signed and Sealed this

Fourteenth Day of January, 1997

Attest:

BRUCE LEHMAN

*Attesting Officer*  *Commissioner of Patents and Trademarks*